United States Patent [19]
Slaven et al.

[11] 3,912,041
[45] Oct. 14, 1975

[54] WATER-OPERATED CARTRIDGE LAUNCHER

[75] Inventors: Thomas L. Slaven, Cardiff, Calif.; John C. Mollere, Nassay Bay, Tex.

[73] Assignee: Hercules Incorporated, Wilmington, Del.

[22] Filed: May 2, 1973

[21] Appl. No.: 356,653

Related U.S. Application Data

[63] Continuation of Ser. No. 115,367, Feb. 16, 1971, abandoned.

[52] U.S. Cl. ................ 181/110; 181/114; 181/116
[51] Int. Cl.² .......................................... G01V 1/02
[58] Field of Search ........... 181/.5 XE, .5 A, .5 VM, 181/116, 110, 114; 42/9, 39.5; 89/33 A, 33 NM, 13 RE; 137/599, 599.1, 268

[56] References Cited
UNITED STATES PATENTS

| | | | |
|---|---|---|---|
| 9,950 | 8/1853 | Stanton | 42/9 |
| 2,002,383 | 5/1935 | Witt | 137/599 |
| 2,623,226 | 12/1952 | Jones | 137/268 |
| 3,360,070 | 12/1967 | Cholet et al. | 181/116 |
| 3,496,532 | 2/1970 | Thigpen | 181/.5 XC |
| 3,578,101 | 4/1971 | Larson | 181/.5 XC |

FOREIGN PATENTS OR APPLICATIONS

| | | | |
|---|---|---|---|
| 3,355 | 11/1826 | France | 42/9 |

*Primary Examiner*—Maynard R. Wilbur
*Assistant Examiner*—G. E. Montone
*Attorney, Agent, or Firm*—Michael P. Breston

[57] ABSTRACT

The cartridge launcher of this invention includes a housing defining a passageway which, in use, is coaxial with a conduit feeding water under pressure through the passageway. A cylindrical bore transversely intersects the passageway and rotatably receives a plug whose diameter is larger than that of the passageway. A barrel extends transversely of the plug for consecutively loading and unloading seismic cartridges at short time intervals. In its loading position, the barrel is in alignment with top and bottom registering openings in opposite walls and is exposed to atmospheric air. In its unloading position, the barrel is coaxially aligned with the passageway and the cartridge therein is propelled by water pressure. Prior to reaching its unloading position, the barrel is completely sealed off from the atmosphere and, conversely, prior to reaching its loading position, the barrel is completely sealed off from the water pressure. Thus, irrespective of the limited movement of the barrel in the bore, no air is allowed to penetrate into the water stream flowing through the passageway of the launcher. At least one pipe is connected in parallel with the passageway to provide a continuous water stream around the passageway.

6 Claims, 6 Drawing Figures

INVENTORS.
THOMAS L. SLAVEN,
JOHN C. MOLLERE,
BY
MICHAEL P. BRESTON

INVENTORS.
THOMAS L. SLAVEN,
JOHN C. MOLLERE,
BY
MICHAEL P. BRESTON

WATER-OPERATED CARTRIDGE LAUNCHER

REFERENCE TO RELATED APPLICATIONS

This application is a continuation of our application Ser. No. 115,367 and now abandoned.

An improved underwater gun which receives the cartridges projected by the launcher of this invention is described in copending patent application Ser. No. 354,270, assigned to the same assignee, now abandoned.

BACKGROUND OF THE INVENTION

A seismic energy system has recently been introduced by the assignee under the tradename MAXIPULSE system. It employs a towed underwater firing gun which receives through a flexible hose water-propelled cartridges or charges from a launcher mounted on the deck of a seismic vessel. The MAXIMPULSE system is described in several U.S. Pat. Nos. 3,509,959, 3,574,298, 3,496, 532, 3,509,820, 3,592,286, 3,601,052, 3,702,984. The present invention is concerned with the launcher used in propelling the explosively-operated seismic charges.

For proper operation, a charge when it reaches the end of its travel in the firing gun must have a desired amount of kinetic energy. If the kinetic energy is insufficient, the charage may not become activated. If the kinetic energy is excessive, the gun may become seriously damaged. The correct amount of kinetic energy is determined by the pressure and the volume of the propelling water stream flowing through the barrel. Controlling the pressure of the water stream becomes very difficult if the launcher allows slugs of air to mix with the water stream each time that the water stream is interrupted by the launcher for the purpose of inserting a cartridge into the barrel. The slugs of air have variable volumes depending on the skill of the person operating the launcher. In any event, air being a compressible gas presents unpredictable problems which, in the case of the MAXIPULSE system can have undesirable and erratic effects. It is essential, of course, that each charge be properly propelled into the towed firing gun and become properly activated therein for detonation outside the gun and at a safe distance therefrom. Premature detonations may damage the gun and halt the progress of the MAXIPULSE seismic survey. The launcher therefore must be completely reliable and safe to the operator handling the explosively-operated seismic charges.

One known water-operated cartridge launcher includes a housing interposed in the water-carrying conduit. The housing has a normally-closed, hinged cover plate which is raised to insert a cartridge inside a bore coaxial with the conduit. After closing the hinged plate, the cartridge becomes propelled through the conduit by the applied water pressure. Another known launcher uses a Ventouri type suction device for drawing in the small cartridges. It was found that the known launchers operated effectively except that slugs of air would periodically enter the water stream and deletoriously affect the operation of the launcher. The known launchers also required fluid-operated controls which rendered the launching operation subject to breakdowns and the skill of its operators. It was also found that because the flow of water in the cartridgecarrying housing was interrupted during each insertion of a cartridge into the water stream, the water pump would frequently breakdown under such variable load conditions.

Accordingly, the main objects of the present invention are: to avoid the drawbacks of the known cartridge launcher, to provide a cartridge launcher which is easy to operate, which is completely safe, which requires a minimum of moving parts, which prevents air from mixing with the cartridge-propelling water stream, and which provides a substantially even load to the water pump.

SUMMARY OF THE INVENTION

The cartridge launcher of this invention comprises a housing having an inlet, an outlet and a passageway coaxial with the inlet and outlet. A cylindrical bore extends transversely of the passageway. The diameter of the bore is considerably larger than the diameter of the passageway. A launching plug is mounted for limited rotation in the bore. A barrel extends transversely of the plug for consecutively receiving cartridges therein. Registering openings in the opposite walls of the housing align with the barrel upon rotation of the plug from a cartridge unloading position to a cartridge loading position. The barrel becomes completely sealed off from the atmosphere and from the water circuit prior to reaching either its loading or unloading position, thereby completely excluding air from the water stream flowing through the passageway. At least one bypass pipe is connected in parallel with the passageway to maintain uninterrupted water flow between the inlet and the outlet irrespective of the position of the plug in the bore.

BRIEF DESCRIPTION OF THE DRAWINGS

Since the MAXIPULSE system is fully described in the above-mentioned patents, a detailed description thereof is not believed necessary. FIG. 1 schematically shows a seismic vessel 14 equipped on its deck 16 with such a MAXIPULSE system for generating seismic waves in a body of water by rapidly and consecutively firing relatively-small, explosively-operated cartridges 12 from a towed underwater gun 10. To operate the gun there is provided a water propulsion system 20 including in its circuit the launcher 19 of this invention and a water pump 24 which continuously pumps sea water through a conduit 22 in the direction of the arrows. The portion of conduit 22 leading from deck 16 into the body of water is flexible. The explosively-operated seismic cartridges 12 are stored in a container 18 positioned near launcher 19.

Figure 2:
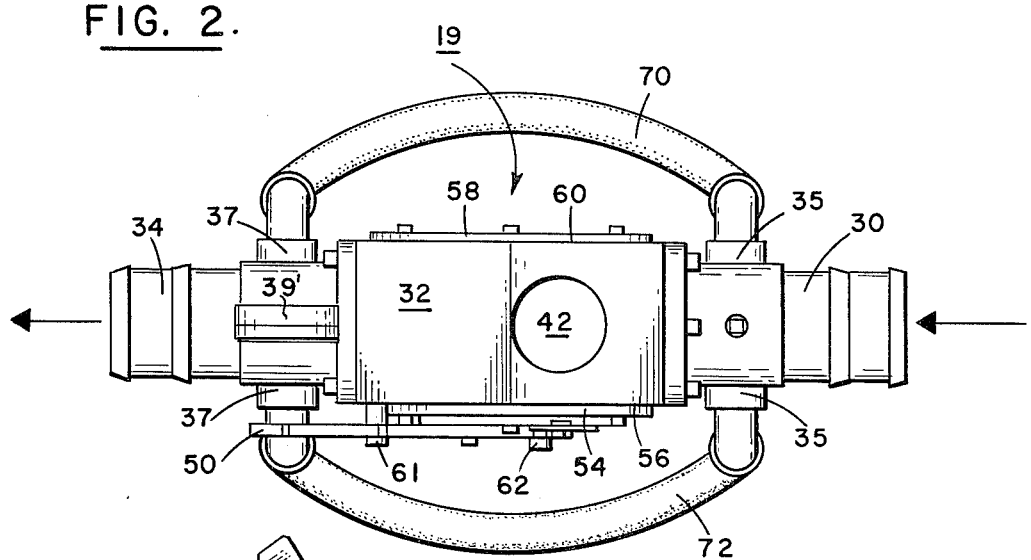
FIG. 2 is a top plan view in elevation of the cartridge launcher.
Figure 1:
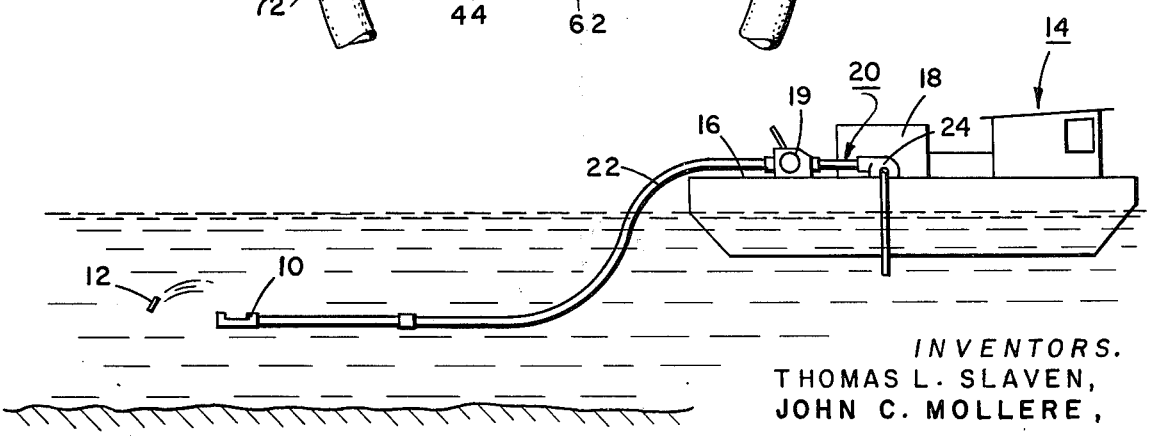
FIG. 1 is a schematic representation of a MAXIPULSE system employing the cartridge launcher of this invention.

Launcher 19 has a housing 32 (FIGS. 1–2) provided with an inlet 30 connectable to the upstream section and an outlet 34 connectable too the downstream section of conduit 22. It is the function of launcher 29 to propel in rapid succession cartridges 12 through outlet 34 into flexible hose 22. Housing 32 defines a cylindrical passageway 36 (FIGS. 4–6), preferably lined with a cylindrical sleeve 38 (FIG. 4) made of a soft material such as plastic to allow cartridges 12 to easily slide out of the passageway. The bore of sleeve 38 is coaxial with the bores of inlet 30 and outlet 34.

A cylindrical bore 39 (FIG. 4) extends between the front and back walls of housing 32 and transversely intersects passageway 36. The center 41 of bore 39 (FIG. 6) lies on the longitudinal axis of passageway 36. The diameter of bore 39 is considerably greater than the diameter of passageway 36 for reasons that will become subsequently apparent.

Figure 4:
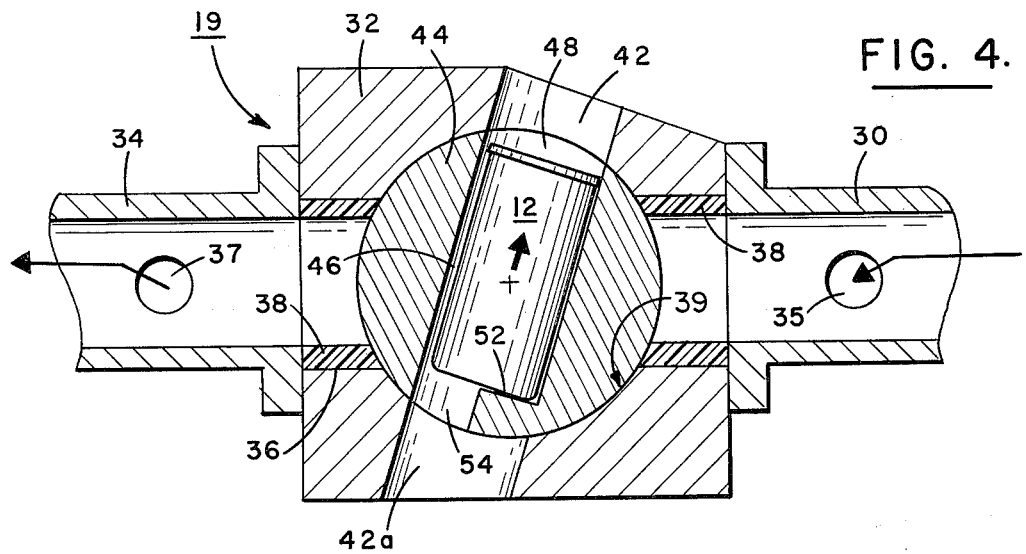
FIGS. 4–6 are sectional views of the launcher respectively illustrating the loading, sealed-off and unloading positions of the barrel.
Figure 5:
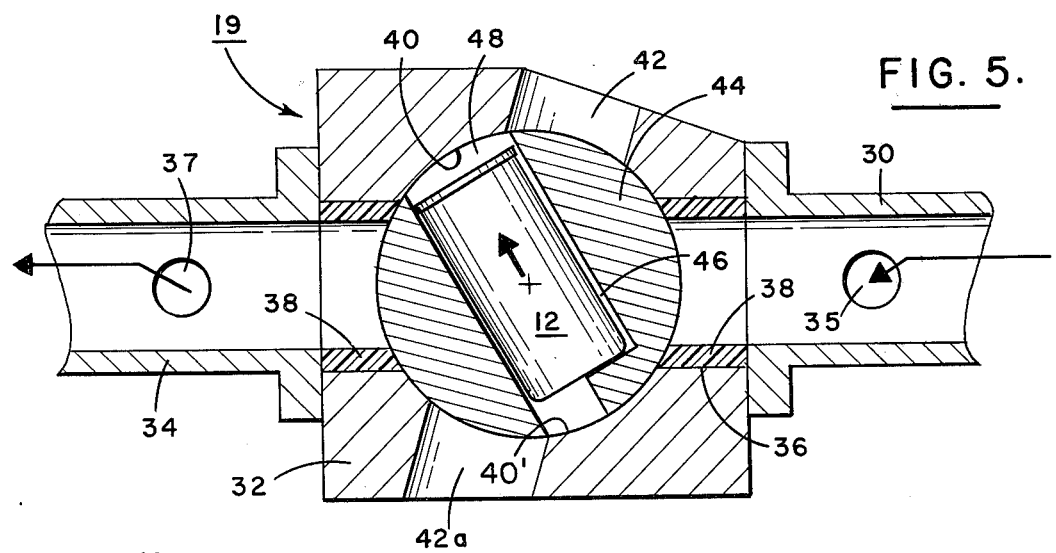

A launching plug 44 is mounted for limited rotation in bore 39. Plug 44 defines a barrel 46 which extends transversely of the plug. Barrel 46 has a circular cross-sectional area and a height slightly greater than the height of a cartridge 12. The bottom portion of barrel 46 has a reduced cross-sectional area port 54 which serves (1) to provide a stop shoulder 52 that prevents a cartridge 12 from accidentally moving upstream into inlet 30, (2) to limit the volume of water flowing through barrel 46, and (3) to allow water trapped inside the barrel to drain outside of the launcher. Barrel 46 has a mouth 48 through which the charges are consecutively loaded and unloaded. Openings 42 and 42a in the top and bottom walls of housing 32 respectively register with the mouth 48 and port 54 when the barrel is in its cartridge-loading position (FIG. 4).

Figure 3:
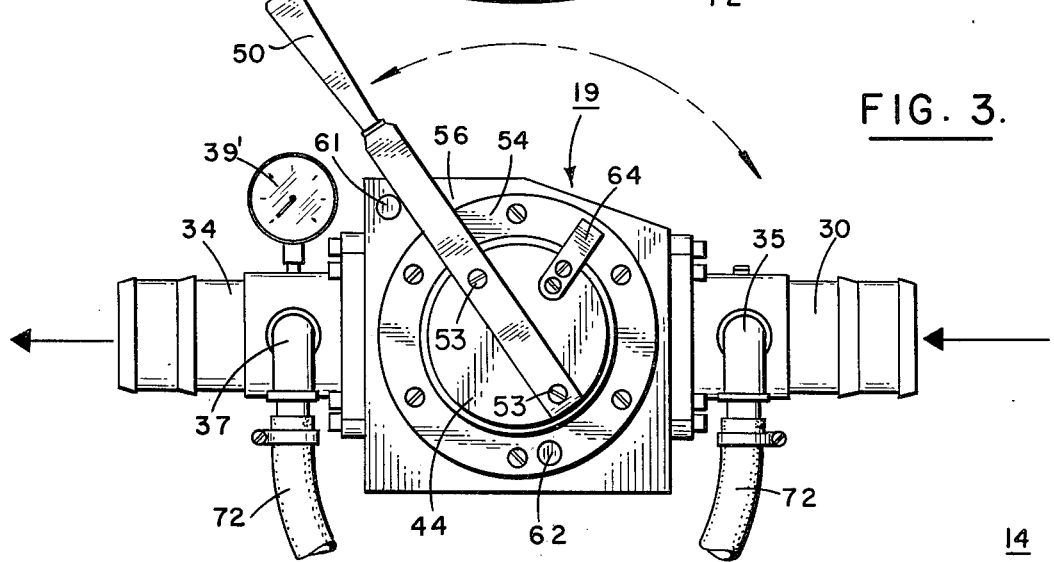
FIG. 3 is a front view in elevation of the cartridge launcher.

Any suitable means, either manually or mechanically operated, can be employed to rotate plug 44 inside bore 39. A simple and reliable means for rotating plug 44 is a handle 50 (FIG. 3) which is secured to the plug by screws 53. Annular plates 54 and 58 are secured to the front and back walls 56 and 60 of housing 32, respectively, to prevent the transverse movement of plug 44 without interferring with its rotational movement inside bore 39. The rotational movement of handle 50 is limited by a fixed stop post 61. A stop lug 64 is provided on plug 44 (FIG. 3). The rotational movement of lug 64 is limited by a fixed stop post 62. The limited rotational movement allows plug 44 and hence barrel 46 to rotate between a loading position and an unloading position.

To prevent a variable load on the water pump 24 and to insure charge initiation, there is provided at least one bypass pipe 70 (FIG. 2) between inlet 30 and outlet 34 in parallel circuit relationship with passageway 36. In the preferred embodiment, a second such bypass pipe 72 is also provided. The pipes are symmetrically arranged relative to a plane containing the longitudinal axis of passageway 36. Each bypass pipe is connected to inlet 30 and outlet 34 by elbows 35 and 37, respectively. A suitable pressure gauge 39' coupled to the outlet 34 to provide a pressure reading to the launcher's operator.

In operation, water under pressure is being continuously delivered by pump 24 to inlet 30. When barrel 46 is in its loading position (FIG. 4), openings 42 and 42a register with the barrel's mouth 48 and port 54, respectively, and plug 44 effectively seals off inlet 30 and outlet 34 from the water circuit or conduit 22. Barrel 46 is open to the atmosphere and any water therein will drain out through port 54. With the barrel in this position, the operator will insert therein a cartridge 12 with its initiable pin (not shown) facing up. The bottom end of the cartridge will rest against shoulder 52. Water continuously bypasses plug 44 through the bypass pipes 70 and 72. No appreciable amount of air can enter into these bypass pipes because plug 44 effectively seals them off from the atmosphere. The soft material of sleeve 38 assists in the sealing operation.

Figure 6:
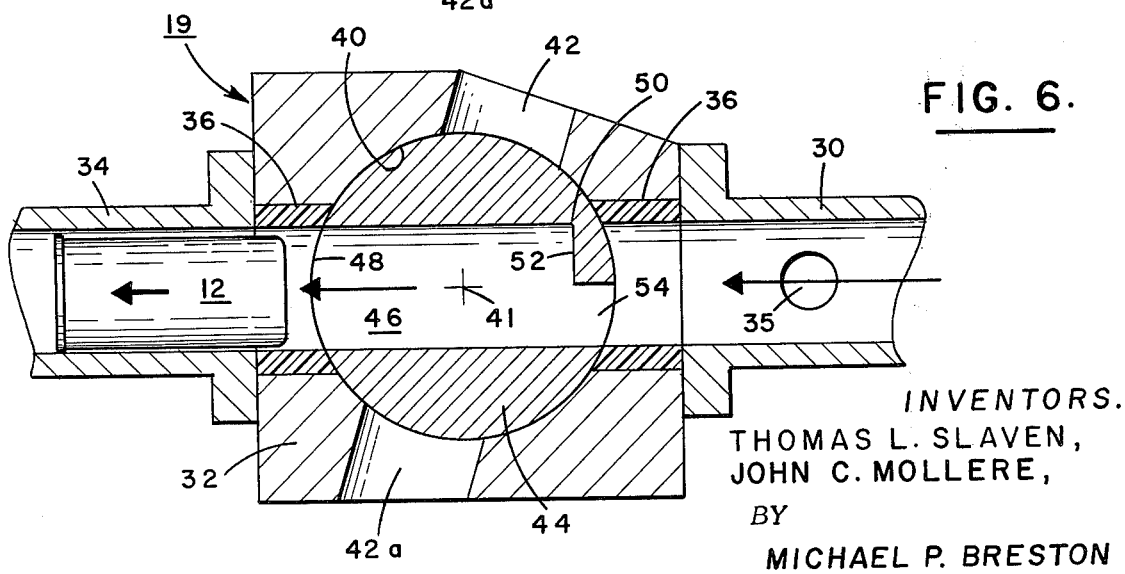

After cartridge insertion, the operator moves handle 50 so as to move away stop lug 64 from post 62 until the handle strikes post 61 (FIG. 3), to thereby rotate plug 44 from the barrel loading position (FIG. 4) to the barrel unloading position (FIG. 6). Prior to reaching its unloading position, barrel 46 becomes completely sealed off both from the water flow circuit and from the atmosphere. This sealed off position occurs (FIG. 5) when the barrel's mouth 48 and port 54 respectively face the opposite sectors 40 and 40' of bore 39 which extend between the inner ends of the passageway 36 and the registering openings 42 and 42a. The arcuate length of sector 40 is such that it completely covers mouth 48 when the barrel is in its sealed off position opposite to sector 40.

After allowing barrel 46 to pass through its sealed off position, handle 50 reaches the stop post 61 thereby bringing the barrel to its unloading position (FIG. 6). In this position the barrel is coaxial with the passageway 36 whereby its port 54 is in alignment with inlet 30 and its mouth 48 is in alignment with outlet 34. The cross-sectional area of port 54 has an extent which is at least sufficient to allow the water pressure to eject cartridge 13 from the barrel through outlet 34. After the cartridge becomes ejected from the barrel, the water pressure from the bypass pipes 70 and 72 could be sufficient to provide the cartridge with adequate kinetic energy for proper initiation of its charge by the gun 10. On the other hand, if the area of port 54 is larger than the minimum required, the total effective cross-sectional areas of the bypass pipes 70 and 72 is reduced so that the combined water flow in hose 22 will be that which is required for proper gun operation. In use, optimum cross-sectional areas for port 54 and the bypass pipes 70, 72 are determined for a particular launcher involved.

In sum, once charge 12 enters into hose 22, the combined water pressure flowing through barrel 46 and through bypass pipes 70 and 72 will have an intensity such as to cause the acceleration of the charge through hose 22 to reach a desired value for proper charge initiation.

After cartridge 12 moves out of plug 44, barrel 46 is rotated from its unloading position, past its sealed off position, and back to its loading position. When passing through its sealed off position, barrel 46 completely breaks communication with the water pressure prior to making communication with the atmosphere. Whatever water is entrapped inside barrel 46 will drain out through port 54.

The cartridge loading and unloading cycles are repeated as many times as necessary. The vertical inclination of the longitudinal axis of registering openings 42 and 42a relative to the longitudinal axis of passageway 36 faciliates the consecutive insertions of the cartridges into barrel 46.

The advantages of the novel launcher of the present invention as above described can be summarized as follows: water pressure continuously bypasses the barrel to maintain an adequate load on pump 24 and to assure that once a cartridge is inside hose 22, it will be propelled downstream irrespective of a malfunction inside the launcher (which might prevent water from flowing through passageway 36); barrel 46 first breaks communication with the atmosphere before it makes communication with the water, and vice versa, shoulder 52 makes it impossible for a cartridge to back flow to pump 24; the launcher can be operated by manipulating a single handle between two fixed posts; the launcher requires no complicated fluid operated control devices; it is safe and reliable in operation even to unskilled operators.

While this invention has been described in connection with preferred embodiments thereof, it will be appreciated that modifications may be made therein without departing from the scope of the claims attached hereto.

What is claimed is:

1. A method of sequentially loading seismic explosive cartridges in a cartridge launcher on a floating platform for delivery to an underwater seismic shooting site through a conduit towed by said platform, said method comprising:

interposing in said conduit a housing defining a passageway;
   pumping water under pressure through said passageway;
   intersecting said passageway with a plug rotatably mounted in a bore extending transversely of said passageway, said plug defining a barrel transversely thereof;
   rotating said barrel from a cartridge-loading position, wherein the barrel communicates with atmospheric air, to a sealed-off position, wherein air and water are excluded from said passageway, and thence to a cartridge-unloading position, wherein said barrel is coaxial with said passageway whereby a cartridge in said passageway is ejected from said launcher into said conduit by the water pressure, and
   continuously pumping water between the upstream and downstream portions of said passageway, on opposite sides of said bore, said downstream portion being connectable to said conduit, to thereby bypass said barrel irrespective of the position of said plug in said bore.

2. A system for generating seismic energy in an underwater seismic survey area utilizing small explosivelyoperated cartridges as the seismic energy source, comprising:

a submerged firing gun, towed by a flexible conduit for firing said cartridges;
   a seismic cartridge launcher positioned on a floating platform which tows said conduit;
   said launcher comprising a housing, a passageway extending through said housing for successively receiving and unloading said cartridges, and a bore extending transversely of said passageway;
   a plug rotatably mounted in said bore and defining an open-ended barrel extending transversely of said plug;
   means for conveying water into said passageway;
   a pair of openings in opposite walls of said housing registering with the opposite open ends of said barrel, and the sectors of said bore extending between the inner ends of said passageway and said openings serving to completely seal off said barrel both from said passageway and from said openings; and
   at least one pipe connected in parallel with said passageway, on the opposite sides of said bore, to allow water to continuously flow through said conduit irrespective of the position of said plug in said bore.

3. The system of claim 2 wherein said barrel has a restricted cross-sectional area to define a seat for the received cartridge in said barrel.

4. A water-operated launcher for launching explosive charges into a continuous stream of water flowing in a conduit, said launcher comprising:

a. a housing having a cylindrical flow passage therethrough defining a barrel;
   b. a cylindrical plug receptacle intersecting said barrel at right angles thereto;
   c. a cylindrical plug rotatably disposed in said receptacle;
   d. a cylindrical charge-receiving chamber extending transversely of the plug and having a diameter equal to that of said barrel;
   e. said chamber being coaxially alignable with said barrel by rotation of said plug;
   f. an abutment element partially closing one end of said chamber;
   g. a charge-loading passage extending through said housing transversely of said flow passage and communicating with said receptacle; and
   h. a by-pass pipe providing water communinication between the upstream and downstream portions of said barrel on opposite sides of said receptacle, said downstream portion being connectable to said conduit.

5. The launcher of claim 4 wherein said abutment element has a cross-sectional area dependent upon the cross-sectional area of said barrel, and
   said by-pass pipe has a cross-sectional area dependent upon said cross-sectional area of said element.

6. A water-operated explosive charge launcher for consecutively launching explosive charges into a continuous stream of water flowing in a conduit, said launcher comprising:

1. a housing having:
      a. a water inlet tube in one side thereof,
      b. a water outlet tube in an opposite side thereof,
      c. a cylindrical flow passage defining a barrel between and in coaxial alignment with said inlet and outlet tubes,
      d. a cylindrical plug receptacle extending transversely of said barrel, said receptacle having a diameter larger than the diameter of said barrel,
      e. a top wall defining a charge-inlet port, and a bottom wall defining a water outlet port; said inlet and outlet ports communicating with said receptacle;
   2. a cylindrical plug mounted for rotation in said receptacle, said plug defining a charge-receiving chamber whose axis is perpendicular to the axis of said plug;
   3. an abutment element partially closing one end of said chamber, said element having a cross-sectional area dependent on the cross-sectional area of said barrel;
   4. means for rotating said chamber from a cartridge-loading position, wherein said chamber is coaxial with said inlet port, to a cartridge-unloading position wherein said chamber is coaxial with said inlet and outlet tubes;
   5. said plug receptacle having diametrically-opposed wall portions which completely cover the top and bottom ends of said chamber when said chamber is oriented between its loading and unloading positions; and 6. at least one water by-pass pipe connected between an opening in said inlet tube and an opening in said outlet tube, said by-pass pipe having a cross-sectional area dependent on said cross-sectional area of said abutment element.

* * * * *